United States Patent
Adam et al.

(10) Patent No.: US 10,619,684 B2
(45) Date of Patent: Apr. 14, 2020

(54) PARTIALLY LINED MOTOR-VEHICLE DISK BRAKE WITH FRICTION LININGS WHICH ARE PROVIDED WITH PULL-SUPPORT IN A FRAME-SHAPED HOLDER

(71) Applicant: Continental Teves AG & Co. oHG, Frankfurt (DE)

(72) Inventors: Thorsten Adam, Mühlheim am Main (DE); Jens Bauer, Kleinostheim (DE); Dietrich Golz, Bad Camberg (DE); Mathias Haag, Darmstadt (DE); Valentin Hummel, Bensheim (DE); Christoph Kalff, Lörzweiler (DE); Norman Langer, Eschborn (DE); Christian Lankes, Riedstadt (DE); Ralph Petri, Sulzbach/Ts. (DE); Dirk Simon, Mainhausen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 16/061,892

(22) PCT Filed: Feb. 7, 2017

(86) PCT No.: PCT/EP2017/052653
§ 371 (c)(1),
(2) Date: Jun. 13, 2018

(87) PCT Pub. No.: WO2017/137400
PCT Pub. Date: Aug. 17, 2017

(65) Prior Publication Data
US 2019/0010999 A1    Jan. 10, 2019

(30) Foreign Application Priority Data
Feb. 9, 2016 (DE) .................. 10 2016 201 909

(51) Int. Cl.
*F16D 55/226* (2006.01)
*F16D 65/00* (2006.01)
(Continued)

(52) U.S. Cl.
CPC ....... *F16D 55/226* (2013.01); *F16D 65/0056* (2013.01); *F16D 65/0068* (2013.01);
(Continued)

(58) Field of Classification Search
CPC .............. F16D 55/226; F16D 55/2262; F16D 65/0056; F16D 65/0068; F16D 65/095;
(Continued)

(56) References Cited

U.S. PATENT DOCUMENTS 3,285,371 A * 11/1966 Cadiou ................. F16D 65/095
188/73.32
4,465,163 A     8/1984 Matsumoto
(Continued)

FOREIGN PATENT DOCUMENTS

CN     101427044 A     5/2009
CN     204852088 U    12/2015
(Continued)

OTHER PUBLICATIONS

International Search Report and Written Opinion for International Application No. PCT/EP2017/052653, dated May 16, 2017, 8 pages.
(Continued)

*Primary Examiner* — Thomas J Williams
(74) *Attorney, Agent, or Firm* — RatnerPrestia

(57) ABSTRACT

A partially lined motor-vehicle disk brake of the first caliper type, with a housing including an actuator system as a normal force generator mounted in a slidably guided fashion on a holder, with at least one friction lining which is configured in a hammerhead shape with claws and which is (Continued)

accommodated in a guided fashion with pull-support in holder arms with receptacle recesses in the holder. In order to avoid reversing clicks, the holder is embodied as a closed frame in that holder webs connect the holder arms to one another, and the holder webs are positioned tangentially in front of the housing limbs of the housing. Accordingly, the force flux in the holder is closed, and in the case of pull suspension all the holder arms are nevertheless included in the force flux.

8 Claims, 3 Drawing Sheets

(51) Int. Cl.
  *F16D 65/095* (2006.01)
  *F16D 55/00* (2006.01)
  *F16D 65/02* (2006.01)
(52) U.S. Cl.
  CPC .... *F16D 65/095* (2013.01); *F16D 2055/0008* (2013.01); *F16D 2055/0016* (2013.01); *F16D 2065/1396* (2013.01)
(58) Field of Classification Search
  CPC ..... F16D 2055/0008; F16D 2055/0016; F16D 2065/1396
  USPC ............ 188/73.1, 73.31, 73.37, 73.38, 73.43
  See application file for complete search history.

(56) References Cited

U.S. PATENT DOCUMENTS

| | | | | |
|---|---|---|---|---|
| 5,111,914 | A * | 5/1992 | Thiel | F16D 55/227 188/73.1 |
| 5,297,659 | A | 3/1994 | Thiel et al. | |
| 5,535,856 | A | 7/1996 | McCormick et al. | |
| 5,957,245 | A | 9/1999 | Anger et al. | |
| 6,179,095 | B1 * | 1/2001 | Weiler | F16D 55/226 188/72.3 |
| 6,427,810 | B2 * | 8/2002 | Schorn | F16D 65/097 188/73.38 |
| 8,028,810 | B2 | 10/2011 | Bach et al. | |
| 9,334,909 | B2 * | 5/2016 | Baumgartner | F16D 55/226 |
| 2006/0054425 | A1 * | 3/2006 | Maehara | F16D 55/226 188/71.1 |
| 2006/0076198 | A1 * | 4/2006 | Thiel | F16D 55/227 188/73.43 |
| 2006/0260885 | A1 | 11/2006 | Maehara | |
| 2010/0163350 | A1 * | 7/2010 | Bach | F16D 55/226 188/73.43 |

FOREIGN PATENT DOCUMENTS

| | | | | |
|---|---|---|---|---|
| DE | 2804808 | A1 | 8/1979 | |
| DE | 3816109 | A1 | 11/1989 | |
| DE | 3827686 | A1 | 2/1990 | |
| DE | 3913904 | A1 * | 10/1990 | ........... F16D 55/224 |
| DE | 4036272 | A1 | 5/1992 | |
| DE | 4100303 | A1 * | 7/1992 | ........... F16D 55/226 |
| DE | 4430459 | A1 | 2/1996 | |
| DE | 10004181 | A1 | 8/2001 | |
| DE | 10318019 | A1 | 11/2004 | |
| DE | 102005039328 | A1 | 2/2006 | |
| DE | 102014202944 | A1 | 8/2014 | |
| DE | 102014205594 | A1 | 3/2015 | |
| DE | 102006060644 | A1 | 9/2017 | |
| JP | S57149631 | A | 9/1982 | |
| JP | H03501643 | A | 4/1991 | |
| JP | H05501754 | A | 4/1993 | |
| JP | 2003014011 | A | 1/2003 | |
| JP | 2007010072 | A | 1/2007 | |
| WO | 9204553 | A1 | 3/1992 | |
| WO | 2004018892 | A1 | 3/2004 | |

OTHER PUBLICATIONS

German Search Report for German Application No. 10 2016 201 909.0, dated Jan. 17, 2017, including partial English translation, 11 pages.
Notice of Reasons for Refusal for Japanese Application No. 2018-541319, dated Sep. 5, 2019, with translation, 10 pages.
Chinese Office Action for Chinese Application No. 201780008283.6, dated May 20, 2019, with translation, 15 pages.
Korean Office Action for Korean Application No. 10-2018-7020047, dated Sep. 16, 2019, with translation, 13 pages.

* cited by examiner

PARTIALLY LINED MOTOR-VEHICLE DISK BRAKE WITH FRICTION LININGS WHICH ARE PROVIDED WITH PULL-SUPPORT IN A FRAME-SHAPED HOLDER

FIELD OF THE INVENTION

The invention relates to a partially lined motor-vehicle disk brake (15) with a brake caliper (13) as a normal force generator, whose housing which is configured in a U shape, with housing limbs and with a housing bridge which connects the two housing limbs, engages in a U shape around a friction ring and activates at least one associated friction lining (1) via a backplate (5) which bears friction material (6) and has hammerhead-shaped claws (7, 8) protruding in the tangential direction T for providing pull-support for the braking force in a holder, wherein the brake caliper (13) is mounted on the holder so as to be axially slidable, and wherein the holder has a holder profile (2) which comprises in each case an inflow-side holder arm and an outflow-side holder arm with receptacle recesses (3, 4), which have bearing faces (9, 10) and/or support or guide faces including abutments (11, 12) and into which the claws (7, 8) are fitted, wherein application of a tangentially directed circumferential force (Fu, friction force) to the holder induces tensile loading in a claw (7, 8), and vice versa.

BACKGROUND OF THE INVENTION

A partially lined disk brake with particular lift-protection of the generic type with pull-suspension of the friction linings is already known from FIG. 2 of DE 10 2014 202 944 A1, which is incorporated by reference. The pull-support is provided here independently of the direction of rotation.

DE 28 04 808 A1, which is incorporated by reference, discloses a brake which permits successive pull and push support, or the reverse sequence, and for this purpose has quite particular tolerances.

In respect of comfort criteria, in the generic or known disk brakes with pull suspension there is often the complaint that functional and fabrication play which has necessarily precise tolerances but unavoidably has to be made available in the guidance and support means between the holder and lining can cause what is referred to as reversing clicks when the brake is activated after a change of direction of travel.

SUMMARY OF THE INVENTION

Accordingly, an aspect of the present invention aims to improve the known disk brakes of the generic type and, in particular, avoid the disadvantages thereof in respect of comfort.

In an aspect of the invention, the holder is embodied as a closed frame in that holder webs 14, 14' connect the holder arms to one another, and in that the holder webs 14, 14' are positioned tangentially in front of the housing limbs of the housing. Accordingly, the holder is designed such that the force flux is apportioned in a way which permits all the holder arms of the holder to be included in the force flux for the application of braking forces without complex tolerance arrangements, even though a direct application of force takes place only at one of the holder arms (an abutment). Accordingly, there can be a saving of material in the region of the holding arms, or the load-bearing capacity of the holder is correspondingly increased. An aspect of the invention also relates to a particular friction lining with two-point bearing for a brake caliper housing.

BRIEF DESCRIPTION OF THE DRAWINGS

Further details of the means of solving the problem according to an aspect of the invention can be found in the claims together with the description with reference to the drawing. In the drawing:

DETAILED DESCRIPTION OF THE PREFERRED EMBODIMENTS

Figure 1:
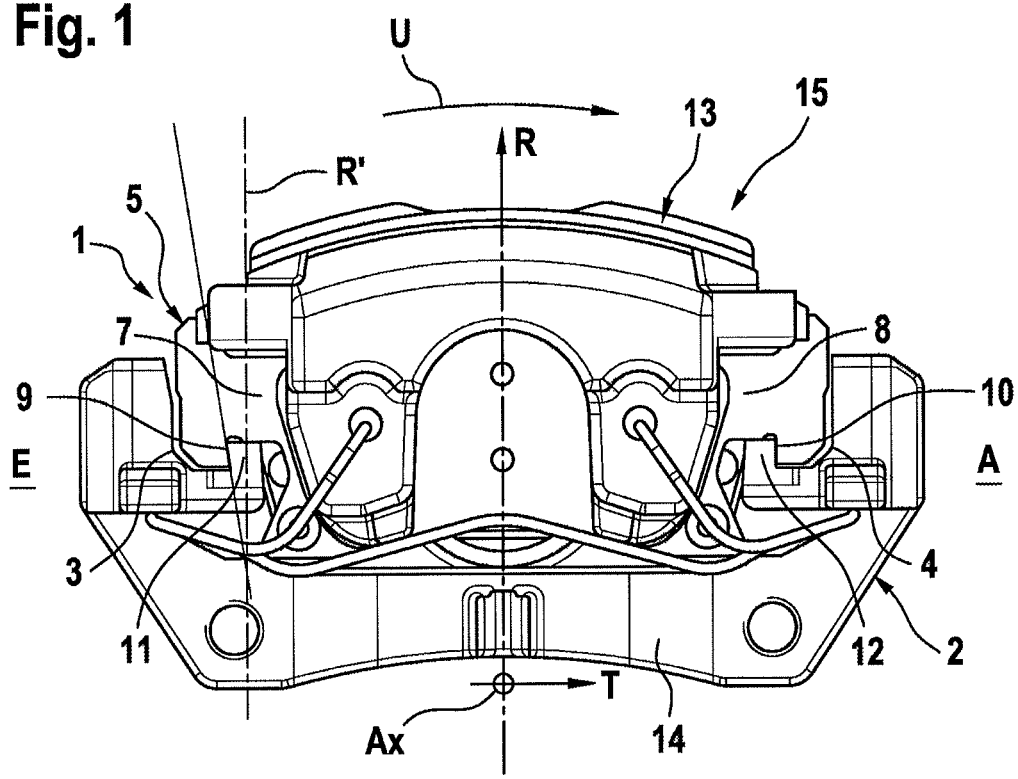
FIG. 1 shows a generic first caliper brake corresponding to FIG. 2 of DE 10 2014 202 944 A1 for the purpose of explanation.
Figure 2:
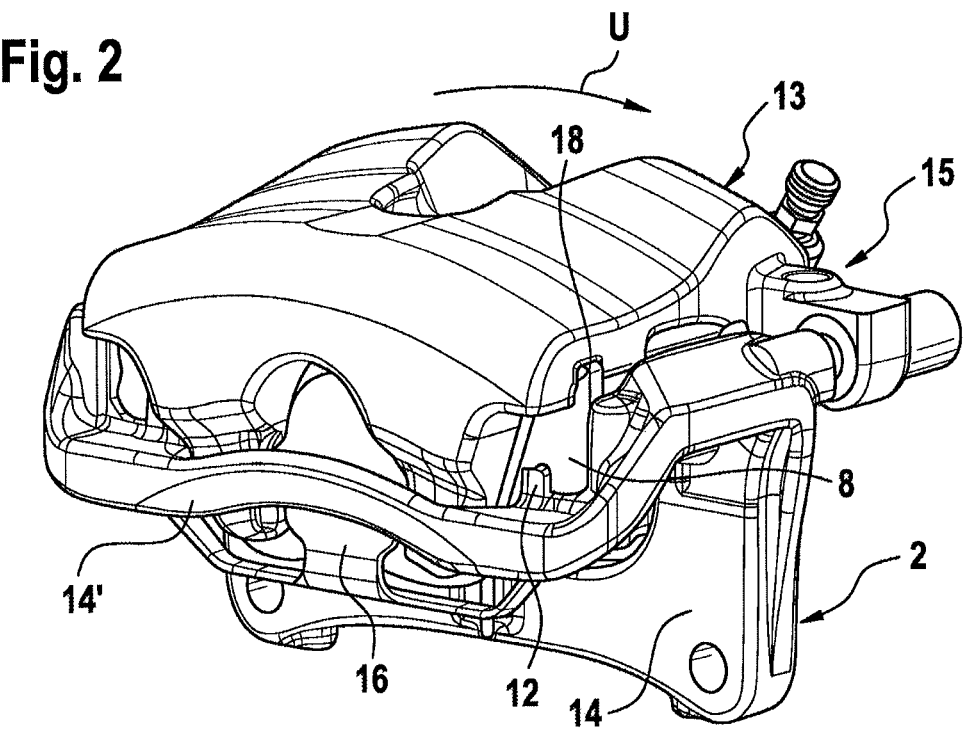
FIG. 2 shows a schematically reduced perspective view of an embodiment of a vehicle disk brake according to an aspect of the invention from the front (first finger side)
Figure 3:
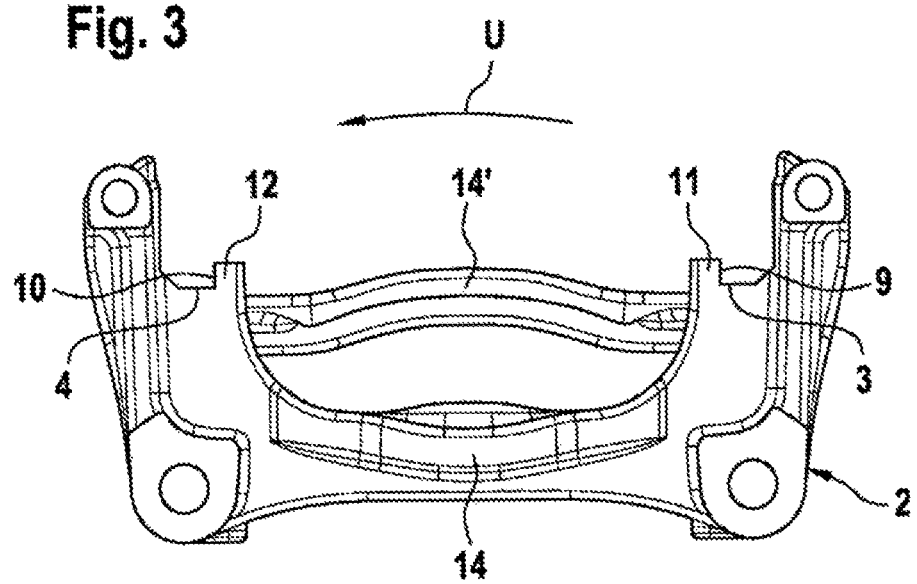
FIG. 3 shows a schematically reduced rear view of a holder (actuator side) without friction linings.
Figure 4:
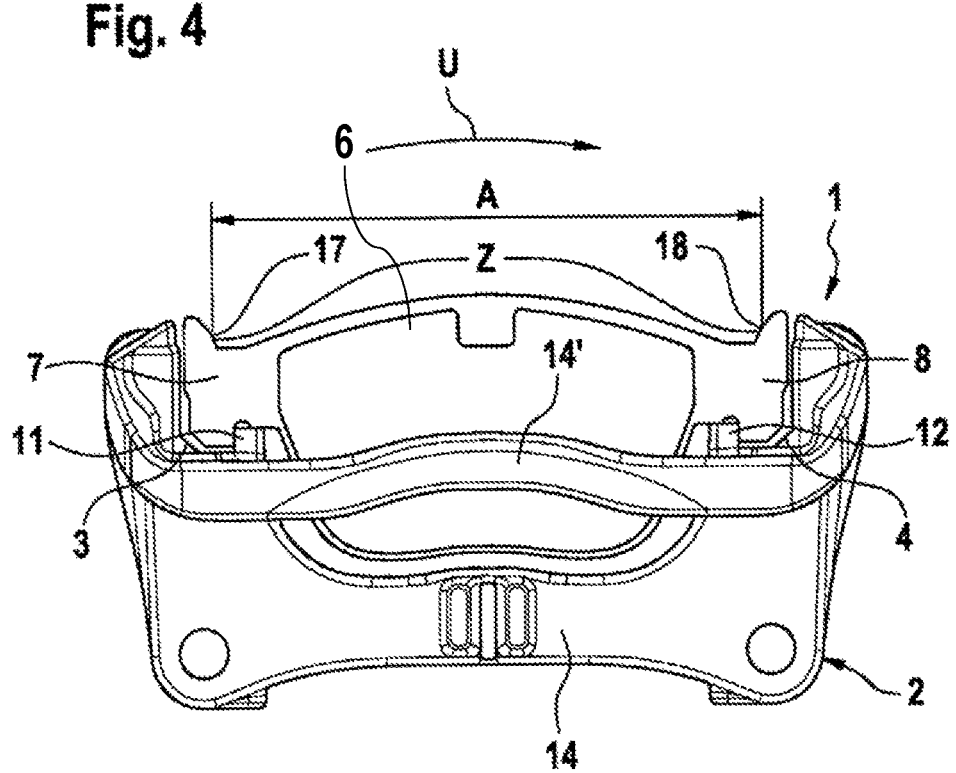
FIG. 4 shows a schematically reduced front view of a holder (first finger side) with friction linings.
Figure 5:
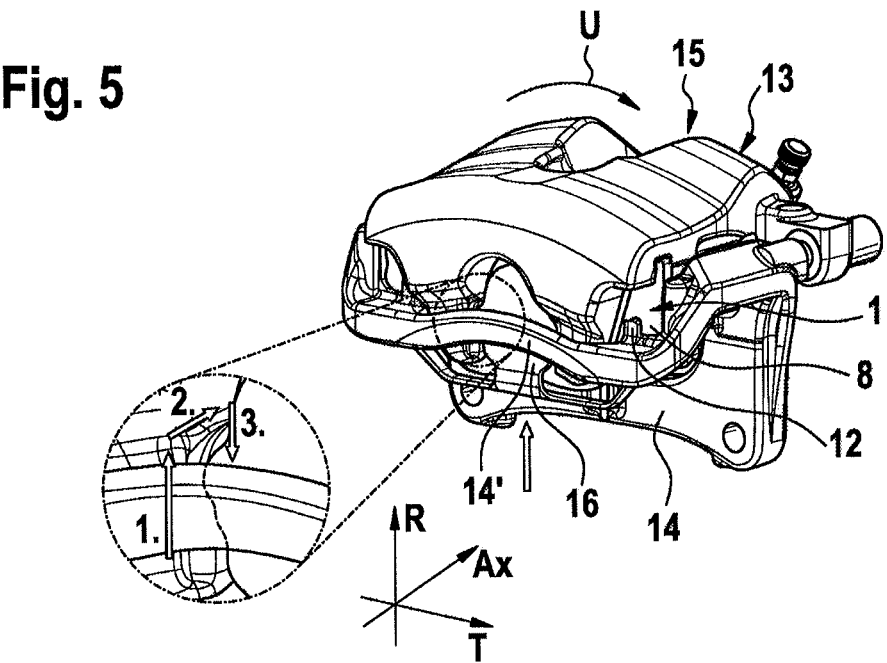
FIG. 5 shows a perspective view as in FIG. 2 with details relating to the radially directed mounting/removal of the brake caliper holding spring
Figure 6:
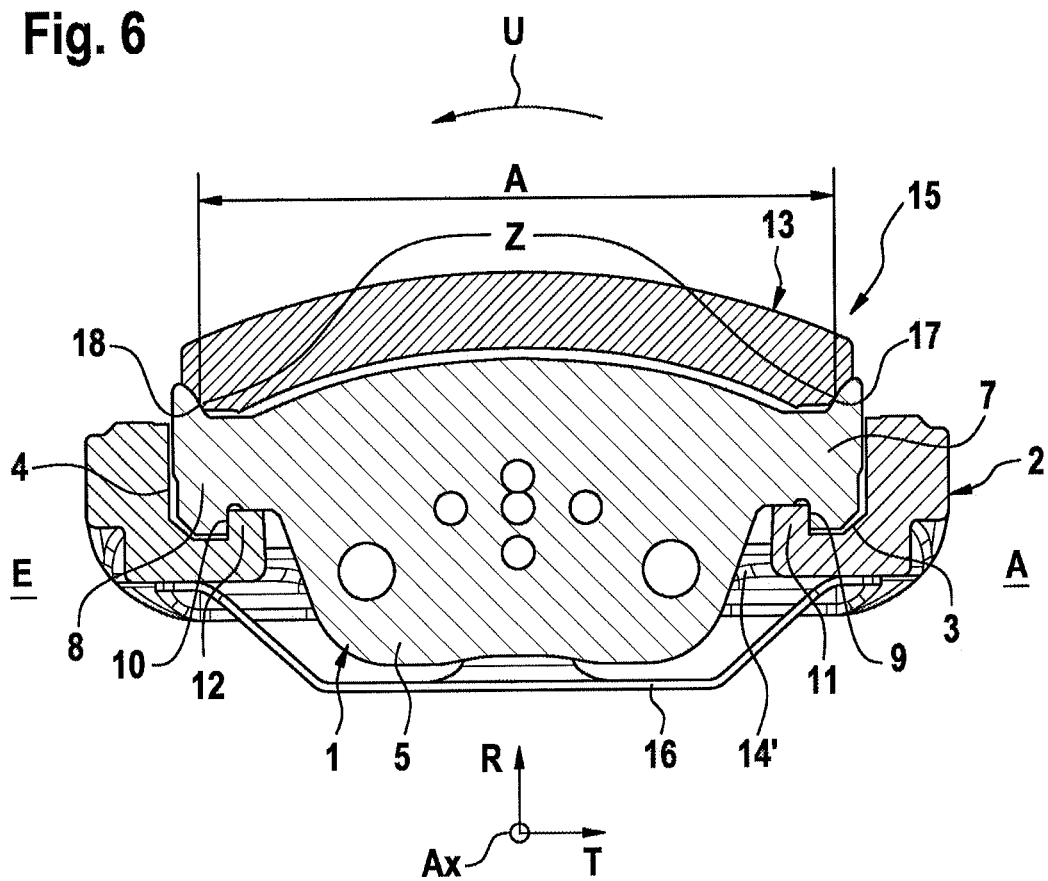
FIG. 6 shows a cross-section clarifying the two-point brake caliper bearing on an outer friction lining.

FIG. 1 clarifies a known vehicle disk brake 15 of the first caliper type with a housing 13 which is mounted in a sliding fashion on a holder. A function of the holder is to support a housing 13 in such way that it can slide in relative terms in the axial direction (parallel to the wheel rotational axis), and is otherwise fixed. The housing 13 is therefore of the first type or floating caliper type, which is correspondingly mounted in an axially sliding fashion on the holder/holder profile 2. As a result, one actuator is in principle sufficient as a normal force generator for directly activating a friction lining, and another friction lining is pressed against the friction ring by reaction force. In this context, the actuator can comprise hydraulic and/or electromechanical activation means.

The housing 13 has a U-shaped housing which engages over a brake disk (not shown). The housing has for this purpose two housing limbs which are connected by a housing bridge. In this case, the inner housing limb is provided with the activation device or devices for directly activating the inner friction lining. The holder has holder profiles 2 which are provided in two holder limbs. These comprise receptacle recesses 3, 4 which are configured as radially open grooves into which an axially symmetric or hammerhead-shaped claw of a backplate 5 is fitted. In order to form the friction lining 1, a block-shaped frictional material 6 is attached approximately centrally to the back plate 5. The directly actuated friction lining 1 can be applied directly to an assigned friction partner (not shown)—such as, particular, to a friction ring, to a brake disk or other rotor/friction partner—using the normal force generator which exerts the axially directed brake application force on the back plate 5. The rest of the process subsequently occurs as result of reaction forces. A piston-cylinder unit or an electric motor transmission arrangement, which is not shown in the drawing for the sake of simplification, usually serves as a tensioning-force-generating element. The housing 13 can thus be activated hydraulically, mechanically, electromechanically and/or in combination by multiple elements, and requires corresponding activation means for this purpose.

In the described known system, a holder profile 2 has the holder arms which protrude in an axially freely projecting fashion and serve primarily to accommodate the friction linings 1. The friction linings 1 comprise at least one backplate 5 composed of steel material with hammerhead-shaped claws 7, 8. The friction material 6 is secured directly or indirectly on the backplate 5. The friction lining 1 serves to abut against the friction ring (not shown) which rotates, together with a wheel to be braked, about a common rotational axis—which is directed parallel to Ax. On the piston side and/or on the first finger side, a damping, plate can be applied, in particular bonded, onto a rear side of the back plate 5.

The transmission of force between the friction lining 1 and the holder profile 2 takes place via at least one bearing face 9, 10 which is arranged radially outward, that is to say perpendicularly, said bearing faces 9, 10 each being symmetrically arranged on the hammerhead-shaped claw 7, 8 of the back plate 5. Each bearing face 9, 10 is respectively assigned an abutment 11, 12 in the holder profile 2, such that, tangentially with respect to the brake disk/friction ring, force is transmitted in a positively locking fashion with tensile loading of the backplate 5. So that this pulled support can be provided independently of the direction of rotation, the hammerheads of known friction linings 1 are each provided with two claws 7, 8 axially symmetrically with respect to the axis S, which claws 7, 8 serve to act on the holder profile 2. On the inflow side (E), reference is always made here to a first engagement between the friction lining 1 and the friction ring, as already defined in DE 10 2014 202 944 A1. For example, a main direction of rotation of a brake disk of a passenger motor vehicle (forward travel) is defined by an arrow U in FIG. 1.

Details of aspects of the invention can be found in FIGS. 2-6. In this case, the present problem is solved in the combination of features. The holder is generally constructed here as an enclosed frame in that all the holder arms are connected to one another by holder webs 14, 14', which has a correspondingly positive effect on the distribution in the force flux. In this case, the holder webs 14, 14' are arranged in a space-saving and effective fashion, presented essentially in parallel in front of the housing limbs of the first caliper. As result of the connection of the holder arms of the holder which is closed in such way, without free ends, the holder is provided with a stable, enclosed force flux, which results in particularly good dimension accuracy in the region of the guidance of the lining during fabrication. In particular, clearing processes can be carried out with increased precision.

The holder webs 14, 14' can be generally attached integrally to the holder arms by casting. This requires a new specific mold for the fabrication of the holder. However, in a refinement of an aspect of the invention it can also be appropriate for at least one axially external holder web 14' to be detachably secured to the holder arm. For example, a holder web can be screwed to two holder arms. This type of detachable connection additionally generates a high-quality appearance in respect of technology. If an axially external holder web is detachably secured, this can facilitate maintenance, such as in particular a change of friction lining. It is not absolutely necessary to develop a separate casting technology for the frame-shaped holder, but instead the conventionally fabricated open holders are strengthened to a certain degree by mounting processes.

In an additionally favourable refinement of an aspect of the invention, particularly protected and inconspicuous positioning of a novel leaf spring 16 is proposed as a brake caliper holding spring which is clamped in between the brake caliper 13 and holder, while being guided from a brake disk chamber, that is to say from radially inward to radially outward, such that the brake caliper holding spring moves, as it were, visually into the background through the forced guidance, and the mountability is also improved. The removal of this leaf spring 16 is also easier, because it is carried out in a reversible fashion through the inevitable radial guidance between the brake caliper 13 and the holder.

A particularly stable, that is to say rattle-free, engagement and force flux in the elastic preloading and bearing between the brake caliper 13 and friction lining 1 is made possible here in conjunction with a particular two-point bearing Z, the contact points 17, 18 of which are arranged at an outermost distance A with respect to one another, in each case in the region of the hammerhead-shaped claws 7, 8, specifically on the rear side thereof, at least on the axially outer friction lining (outboard). It is recommended here, in particular, that an aspect of the invention be used in what are referred to as frame calipers with a particularly broadly dimensioned brake caliper bridge. The mutual contact points 17, 18 between the brake caliper bridge and friction lining can be uniformly spherical, beveled or embodied in such a way that differently implemented shapes respectively face one another. Because the particularly embodied closure part is therefore an essential component of this arrangement, accordingly friction linings 1 with hammerhead-shaped claws 7, 8, which make possible a particularly vibration-resistant bearing arrangement for a brake caliper 13, are also claimed herewith. The latter is advantageously embodied as a receptacle, which is at a distance and largely opened in a V shape, for the brake caliper bridge in conjunction with the two-point bearing Z on the rear sides of the two hammerhead-shaped claws 7, 8.

An aspect of the invention therefore permits, in a further summary, the following advantages:

- Avoidance of "clicking" noises, in particular reversing clicking
- Reduction of the residual torque
- Avoidance of friction lining oblique wear
- Vibration-resistant brake caliper suspension—defined brake caliper bearing
- Simply guided radial mounting of a leaf-shaped brake caliper holding spring
- Brake caliper holding spring can easily be combined with a decorative panel function through integral molding of a screen
- Standardisation, that is to say identically formed friction lining carrier (rear-site) panels for first-side and piston-side friction lining

LIST OF REFERENCE SIGNS

A Distance
Ax Axial direction
C Coding
MT Lifting-out torque
R Radial direction
S Axis
SP Friction force engagement point
T Tangential direction
U Arrow
Z Two-point bearing
1 Friction lining
2 Holder profile
3,4 Receptacle recess
5 Backplate
6 Friction material
7 Claw 8 Claw
9 Contact area
10 Contact area
11 Counterbearing
12 Counterbearing
13 Housing
14, 14' Holder web
15 Partially lined motor-vehicle disk brake
16 Leaf spring
17 Contact point
18 Contact point

The invention claimed is:

1. A partially lined motor-vehicle disk brake with a brake caliper as a normal force generator, whose housing which is configured in a U shape, with housing limbs and with a housing bridge which connects the two housing limbs, engages in a U shape around a friction ring and activates at least one associated friction lining via a backplate which bears friction material and has tangentially protruding, hammerhead-shaped claws for providing pull-support for the braking forces in a holder, wherein the brake caliper is mounted so as to be slidable axially relative to the holder, and wherein the holder has a holder profile which comprises in each case an inflow-side holder arm and an outflow-side holder arm with receptacle recesses, which have bearing faces and/or support or guide faces including abutments and into which the claws are fitted, such that application of a tangentially directed circumferential force to the holder profile induces tensile loading in a claw, and vice versa, wherein the holder is embodied as a closed frame in that holder webs connect the holder arms to one another, and the holder webs are positioned tangentially in front of the housing limbs of the brake caliper, wherein a two-point bearing, contact points of which are defined at a distance from one another on the hammerhead-shaped claws, is provided between the brake caliper and friction lining, each of the contact points comprising a convex surface on a rear side of the respective hammerhead-shaped claw and a corresponding concave surface on the housing bridge.

2. The partially lined motor-vehicle disk brake as claimed in claim 1, wherein the holder webs are provided integrally on the holder arms.

3. The partially lined motor-vehicle disk brake as claimed in claim 1, wherein an axially external holder web is detachably secured to the two holder arms.

4. The partially lined motor-vehicle disk brake as claimed in claim 1, wherein a leaf spring is clamped in between the brake caliper and holder, said leaf spring being provided elastically pre-loaded in a radial direction R between the housing limb and holder.

5. The partially lined motor-vehicle disk brake as claimed in claim 4, wherein the leaf spring is accommodated in at least one positively locking forced guidance means and/or receptacle between the holder and brake caliper.

6. A friction lining with hammerhead-shaped projections which contain claws for providing pull-support in a holder, wherein the friction lining has bearings on a rear side of its hammerhead-shaped claws, wherein two claws which are arranged tangentially at a defined distance from one another define a two-point bearing for a brake caliper on their rear sides, each contact point of the two-point bearing comprising a convex surface on the rear side of the respective hammerhead-shaped claw.

7. The friction lining as claimed in claim 6, wherein each hammerhead-shaped claws further defines a bearing surface on the rear side thereof which is configured to contact a corresponding bearing face of a holder profile of the holder.

8. The friction lining as claimed in claim 6, wherein the convex surfaces on the rear side of the respective hammerhead-shaped claw define a V-shaped receptacle for receiving a housing bridge of the brake caliper.

* * * * *